United States Patent
Lin et al.

(10) Patent No.: US 10,970,860 B1
(45) Date of Patent: Apr. 6, 2021

(54) CHARACTER-TRACKING SYSTEM AND CHARACTER TRACKING METHOD

(71) Applicant: Wistron Corp., New Taipei (TW)

(72) Inventors: Po-Shen Lin, New Taipei (TW); Shih-Wei Wang, New Taipei (TW); Yi-Yun Hsieh, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/791,535

(22) Filed: Feb. 14, 2020

(30) Foreign Application Priority Data

Oct. 25, 2019 (TW) ................................. 108138532

(51) Int. Cl.
*H04N 7/18* (2006.01)
*G06T 7/292* (2017.01)
*G06K 9/00* (2006.01)
*G06T 7/246* (2017.01)
*G06K 9/03* (2006.01)

(52) U.S. Cl.
CPC .......... *G06T 7/292* (2017.01); *G06K 9/00288* (2013.01); *G06K 9/00362* (2013.01); *G06K 9/00771* (2013.01); *G06K 9/00926* (2013.01); *G06K 9/03* (2013.01); *G06T 7/246* (2017.01); *H04N 7/181* (2013.01); *G06T 2207/30196* (2013.01); *G06T 2207/30232* (2013.01)

(58) Field of Classification Search
CPC ..................... G06T 7/292; G06T 7/246; G06T 2207/30196; G06T 2207/30232; G06K 9/00288; G06K 9/00362; G06K 9/00771; G06K 9/00926; G06K 9/03; H04N 7/181

USPC ............................................ 348/77; 382/170
See application file for complete search history.

(56) References Cited

U.S. PATENT DOCUMENTS

| | | | |
|---|---|---|---|
| 10,108,850 B1* | 10/2018 | Das ................... | G06K 9/00885 |
| 2007/0211938 A1* | 9/2007 | Tu ...................... | G06K 9/00295 |
| | | | 382/170 |
| 2011/0128362 A1* | 6/2011 | Shi ..................... | G06K 9/00255 |
| | | | 348/77 |
| 2013/0010095 A1* | 1/2013 | Aoki .................. | G06K 9/00268 |
| | | | 348/77 |
| 2018/0336687 A1* | 11/2018 | Mudretsov ......... | G06K 9/00771 |

* cited by examiner

*Primary Examiner* — Jayanti K Patel
*Assistant Examiner* — Richard B Carter
(74) *Attorney, Agent, or Firm* — McClure, Qualey & Rodack, LLP

(57) ABSTRACT

A character-tracking system is provided. The system includes a plurality of cameras, a first computing server, a second computing server, and a third computing server. The cameras are configured to capture scene images of a scene with different shooting ranges. The first computing server performs body tracking on a body region in the scene image to generate character data. The third computation server obtains a body region block from each scene image according to the character data for facial recognition to obtain user identity. The first computing server further performs person re-identification on different body regions to link the body regions with its person tag belonging to the same user. The first computing server further represents the linked body regions and their person tags with a corresponding user identity.

18 Claims, 4 Drawing Sheets

CHARACTER-TRACKING SYSTEM AND CHARACTER TRACKING METHOD

CROSS REFERENCE TO RELATED APPLICATIONS

This Application claims priority of Taiwan Patent Application No. 108138532, filed on Oct. 25, 2019, the entirety of which is incorporated by reference herein.

BACKGROUND OF THE INVENTION

Field of the Invention

The present invention relates to character-tracking techniques in video surveillance, and, in particular, to a character-tracking system and a character-tracking method.

Description of the Related Art

Surveillance systems with facial recognition technology have been widely used in more and more scenes. For example, it can be seen in factories or offices that many companies have set up surveillance cameras and introduced facial-recognition technology to conduct safety control. However, in the environment of some factories, if only facial recognition is used for security management, certain obstacles may be encountered, such as the user not facing the lens of the camera, the distance between the user and the camera not being appropriate, the dimming light, or the user moving too fast. In the aforementioned situations, facial recognition may have a significant decrease in recognition rate, so it is not possible to use facial recognition to accurately track people.

BRIEF SUMMARY OF THE INVENTION

Accordingly, a character-tracking system and a character-tracking method are provided in the disclosure. The system and method are capable of utilizing facial-recognition technology with body recognition to track the user's path in the images captured by different cameras, thereby solving the aforementioned problems.

In an exemplary embodiment, a character-tracking system is provided. The character-tracking system includes: a plurality of cameras, a first computing server, a second computing server, and a third computing server. The cameras are configured to capture scene images of a scene with different shooting ranges. The first computing server is configured to detect a body region from each scene image captured by each camera, and track the detected body region in each scene image captured by each camera. The first computing server transmits character data corresponding to the detected body region in each scene image to the third computing server through the second computing server. The third computing server retrieves a body region block from each scene image according to the character data, and performs facial recognition on the retrieved body region block. In response to the third computing server recognizing a user identity corresponding to the body region block, the third computing server adds the recognized user identity to the character data to update the character data, and transmits the updated character data to the first computing server through the second computing server. The first computing server performs a person re-identification (ReID) process on the body region in each scene image captured by each camera to link the body region and a corresponding person tag belonging to the same user in each scene image. The first computing server represents the linked body region and corresponding person tag with the recognized user identity.

In some embodiments, the first computing server assigns the person tag corresponding to body region in each scene image, packs coordinates, height, width, scene image number, camera number, and person tag of the detected body region in each scene image captured by each of the cameras to character data, and transmits the character data and scene images to the character-determining module.

In some embodiments, the third computing server receives each scene image and the corresponding character data through the second computing server, and retrieves the body region block from each scene image according to the character data, and each body region block comprises a face and a body.

In some embodiments, the third computing server performs face detection on the body region block to retrieve a face region, and compares the detected face region with a pre-enrolled facial database for facial recognition.

In some embodiments, in response to the third computing server being incapable of recognizing the user identity from the scene image, the third computing server adds recognition-failure information to the character data.

In some embodiments, the first computing server assigns a corresponding person tag to each body region detected from each scene image, and replaces the person tag corresponding to each scene image with the user identity recognized by the third computing server according to a successful facial-recognition result in each scene image from the third computing server.

In some embodiments, the user identity comprises a name, code, or employee number of a specific user.

In some embodiments, the first computing server transmits a user interface including the user identity for each camera to a web server via a web service application programming interface (API), so that the web server provides web services for browsing the user interface.

In some embodiments, the first computing server transmits the real-time updated user interface to the web server after every predetermined period of time.

In some embodiments, in response to the first computing server determining that a specific user is approaching a warning-sign area in the scene in the scene image captured by a specific camera, the first computing server labels column information about the specific user on the user interface.

In another exemplary embodiment, a character-tracking method for use in a character-tracking system is provided. The character-tracking system comprises a plurality of cameras, a first computing server, a second computing server, and a third computing server. The method includes the following steps: utilizing the cameras to capture scene images of a scene with different shooting ranges; utilizing the first computing server to detect a body region from each scene image captured by each camera, and tracking the detected body region in each scene image captured by each camera; utilizing the first computing server to transmit character data corresponding to the detected body region in each scene image to the third computing server through the second computing server; utilizing the third computing server to retrieve a body region block from each scene image according to the character data, and perform facial recognition on the retrieved body region block; in response to the third computing server recognizing a user identity corresponding to the body region block, utilizing the third computing server to add the recognized user identity to the character data to update the character data, and transmit the updated character data to the first computing server through the second computing server; utilizing the first computing server to perform a person re-identification (ReID) process on the body region in each scene image captured by each camera to link the body region and a corresponding person tag belonging to the same user in each scene image; and utilizing the first computing server to represent the linked body region and corresponding person tag with the recognized user identity.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is best determined by reference to the appended claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
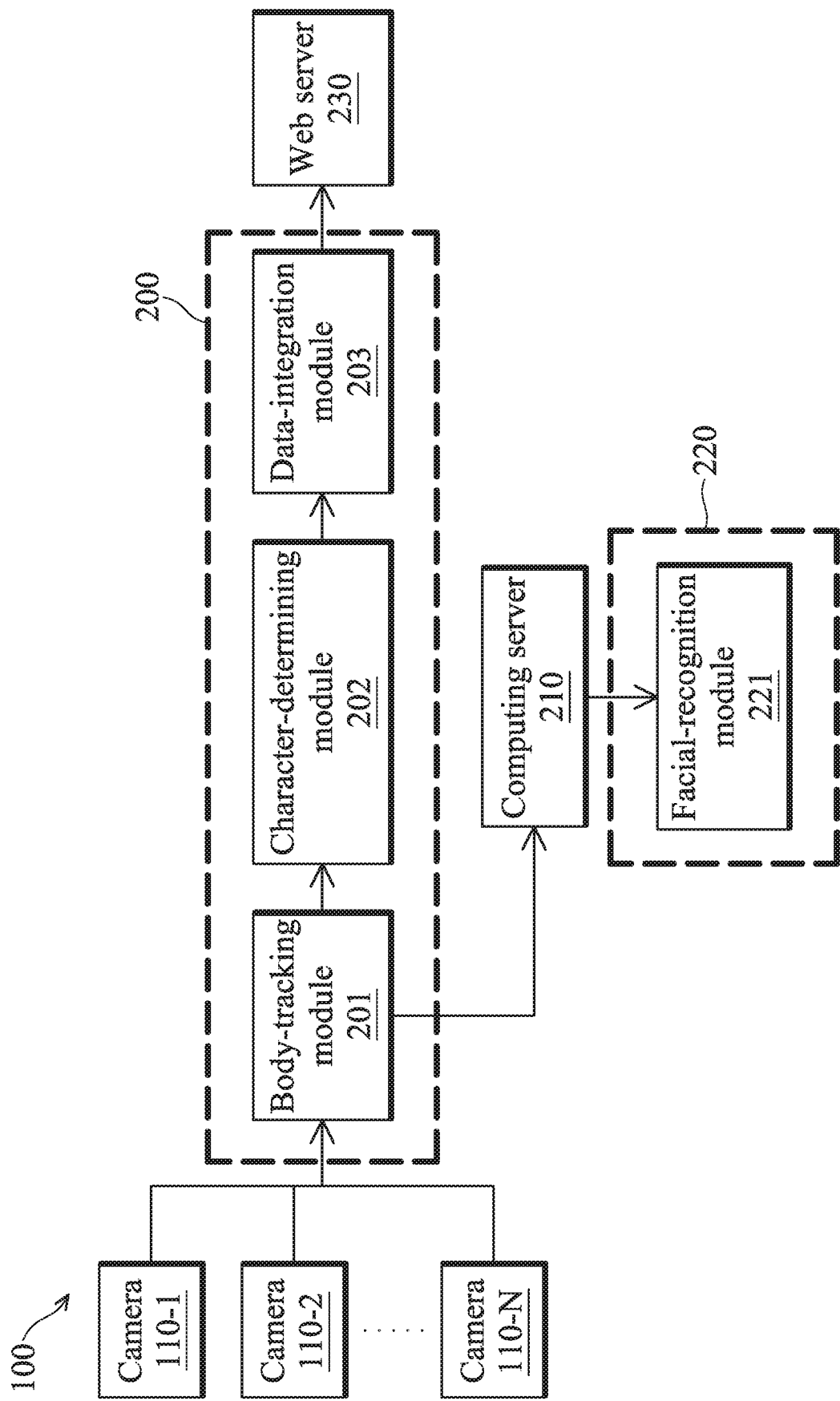
FIG. 1 is a diagram of a character-tracking system in accordance with an embodiment of the disclosure.

FIG. 1 is a diagram of a character-tracking system in accordance with an embodiment of the disclosure. The character-tracking system 100 may include a plurality of cameras 110-1 to 110-N, and computing servers 200, 210, and 220, and a web server 230. In an embodiment, each of the cameras 110, for example, may be disposed at a different position in a user environment or scene to continuously shoot scene images of different shooting ranges in the user environment. The aforementioned user environment may be a factory, an office, a home, or other similar indoor spaces. The shooting ranges of each of the cameras 110-1 to 110-N may have partial areas overlapping or not overlapping with each other. In addition, each of the cameras 110-1 to 110-N has a corresponding camera number such as C1 to CN.

The computing servers 200, 210, and 220, for example, may be implemented by one or more personal computers, workstations, cloud servers, and other computing devices with computing capabilities, but the disclosure is not limited thereto. In some embodiments, the computing servers 200, 210, and 220 can be integrated into the same computing server.

The computing server 200, for example, may be a character-tracking server, and be configured to perform person tracking according to the scene images captured by the cameras 110-1 to 110-N, and the result of person tracking (e.g., identified users and their identities, or unrecognizable users) can be provided to a web server through a web application programming interface (API) for real-time rendering images captured by each camera and the result of person tracking.

As depicted in FIG. 1, the computing server 200 may include a body-tracking module 201, a character-determining module 202, and a data-integration module 203. The body-tracking module 201, character-determining module 202, and data-integration module 203, for example, may be implemented by different program codes that can be executed by a processor (not shown) in the computing server 200.

The body-tracking module 201, for example, may receive the scene images captured by each of the cameras 110-1 to 110-N, and detect body regions in the scene images. In some embodiments, the body-tracking module 201, for example, may use "You Only Look Once (YOLO)" v2 or v3 algorithms in the field of the present disclosure to perform body detection on each scene image, but the disclosure is not limited thereto. In some other embodiments, the body-tracking module 201 may use other object-recognition technologies known in the field of the present disclosure to perform body detection on each scene image.

If a body region is detected in the scene image, a corresponding image block of the detected body region is captured from the scene image. For example, a corresponding block may be labeled on the scene image, which may be referred to as a body region image or body region block. The body-tracking module 201 may record width, height, and coordinates (e.g., based on the upper-left corner of the body region block) of each body region block. The aforementioned body region image is a human image including a face (e.g., including the head and body), so the resolution of the body region image is less than or equal to that of a scene image captured by each camera 110.

For a continuous image sequence transmitted from each camera 110-1 to 110-N to the body-tracking module 201, the body-tracking module 201 may use the detected body region block in the current scene image (e.g., at time t=n) to predict the person's position. For the scene image sequence captured by the same camera, if the next scene image (e.g., at time t=n+1) also has a predicted person at the relevant position detected by the body-tracking module 201, the body-tracking module 201 will link the body region blocks in the current scene image and the next scene image, and treat them as the same person. In a similar manner, the body-tracking module 201 may link the corresponding body region blocks in the subsequent scene images of the scene image sequence captured by the same camera, thereby determining the movement track of the same person. The above-mentioned method can be regarded as person tracking.

In some embodiments, the body-tracking module 201, for example, may use the optical flow method in OpenCV to perform person tracking on the image sequence captured by each camera in a continuous time. For example, the correspondence between the variations of pixels in the image sequence in the time domain and the adjacent images to find the correlation between the previous frame and the current frame, thereby calculating motion information of the object in the adjacent frames. Those having ordinary skill in the art will appreciate how to use the optical flow method for person tracking, and thus the details will not be described here.

In an embodiment, taking the continuous scene image sequence captured by the camera 110-1 as an example, when the body-tracking module 201 first detects a new body region in the continuous image sequence captured by the camera 110-1, the body-tracking module 201 will automatically assign a temporary person tag to the aforementioned body region, such as P1. If there are various body regions in the continuous scene image sequence, the body-tracking module 201 will also give each detected body region a corresponding temporary person tag. With regard to the continuous scene image sequences captured by other cameras 110-2 to 110-N, the body-tracking module 201 will perform similar processing. In addition, the body-tracking module 201 may pack the coordinates, height/width, scene image number, camera number, and person tag of the detected body region in each scene image captured by each of the cameras 110-1 to 110-N to character data, and transmits the character data and scene images to the character-determining module 202. In addition, the body-tracking module 201 may simultaneously transmit the character data and scene images to the computing server 220.

In some embodiments, some of the cameras 110-1 to 110-N in the scene may be disposed in more critical areas, such as the warning-sign area at the entrance gate. When the body-tracking module 201 determines that a certain character in the scene image is approaching the warning-sign area, the body-tracking module 201 will add another position information to the character data to indicate that the person tag has reached the entrance gate. The body-tracking module 201 will also transmit the character data added with the position information to the character-determining module 202.

The computing server 210 is a relay server that is configured to receive each scene image and corresponding character data from the body-tracking module 201 of the computing server 200, and transfer each scene image and corresponding character data to the computing server 220 for facial recognition. In addition, the computing server 210 may be further configured to receive the facial-recognition result (e.g., having the scene-image number, camera number, etc.) of each scene image from the computing server 220, and transfer the facial-recognition result to the character-determining module 202 of the computing server 200.

The computing server 220, for example, may be a facial-recognition server that includes a facial-recognition module 221. The facial-recognition module 221 may be configured to receive each scene image and corresponding character data from the computing server 210, and find the corresponding body region block (e.g., including the face and body) using the coordinates, height, and width of the body region block provided by the character data. In addition, the facial-recognition module 221 may perform facial recognition on the body region block using the Facenet technology developed by Google™ in the art of the present disclosure. One having ordinary skill in the art will appreciate how to use the Facenet technology to perform facial recognition, and thus the details will not be described here.

For example, the flow of facial recognition can be divided into face detection and identity recognition. If the facial-recognition module 221 is capable of recognizing the user identity in the scene image by performing facial recognition (e.g., may compare the face region with the pre-enrolled facial database) on the face region of the body region block in the scene image, the facial-recognition module 221 may attach the identified user identity to the character data. If the facial-recognition module 221 is not capable of recognizing the user identity in the scene image by performing facial recognition, the facial-recognition module 221 may add the information of failed recognition to the character data. The facial-recognition module 221 may then transmit the updated character data to the character-determining module 202 of the computing server 200 through the computing server 210.

The character-determining module 202 may be configured to integrate data from the body-tracking module 201 and facial-recognition module 221. For example, if the facial-recognition module 221 is capable of recognizing the user identity from the scene image, the character data received by the character-determining module 202 from the facial-recognition module 221 through the computing server 210 may include the recognized user identity. Accordingly, the character-determining module 202 may replace the temporary person tag (e.g., P1) in the character data corresponding to the scene image from the body-tracking module 201 with the user identity (e.g., U2) recognized by the facial-recognition module 221.

Specifically, with regard to body-tracking module 201, the body-tracking module 201 is capable of recognizing different body regions from each scene image, and assigning a corresponding temporary person tag to each recognized body region. However, the body-tracking module 201 cannot confirm the user identity of each body region in the scene image. That is, the user identity of each person tag is unknown, and thus the facial-recognition module 221 is required to perform facial recognition on the body region block in each scene image to confirm the user identity. If the facial-recognition module 221 is capable of recognizing the user identity from the scene image, the character-determining module 202 may replace the temporary person tag in the character data corresponding to the scene image from the body-tracking module 201 with the user identity recognized by the facial-recognition module 221, where the recognized user identity indicates the relevant person enrolled in the facial database.

In an embodiment, the character-determining module 202 is further capable of performing the person re-identification (ReID) technology to synchronize and compare the characters in two scene images captured by two different cameras to determine whether these two characters are the same person. If it is determined that these two characters are the same person, the timestamp of the scene image can be compared again to determine the order in which the person appeared in the shooting range of two different cameras.

"Person re-identification" literally means re-recognizing people, for example, a process of establishing a corresponding relationship for pedestrian images shot by different cameras with non-overlapping field of views. When the shooting ranges of different cameras are not overlapping, because there is no continuous information, the difficulty of searching for persons in the scene images will increase greatly. Accordingly, the person ReID technology emphasizes searching for a specific person in the videos captured by different cameras. The person ReID technology described in the aforementioned embodiment can be implemented using the well-known person ReID technology in the art of the present disclosure, and thus the details will not be repeated here.

The person ReID function of the character-determining module 202 may make up for the deficiencies in body tracking technology. For example, if a specific person appears in a scene image sequence captured by a camera, the body tracking technology may not accurately recognize each person appeared in the scene image sequence as the same person due to certain factors (e.g., excessive movement or fast movement of the person), which may be called a tracking interruption situation. Thus, the person ReID function of the character-determining module 202 is not only capable of recognizing the same person from the scene images captured by different cameras, but also capable of recognizing the same person from the successive scene images captured by the same camera that may have the tracking interruption situation.

In an embodiment, the character-determining module 202 may further include a function of automatically clearing the temporarily stored characters. For example, because the character-determining module 202 needs to count the character information that currently exists in the scene image captured by each camera and each scene image may include a great number of characters, the number of character information that needs to be stored by the character-determining module 202 will also become quite large as the time increases. Accordingly, after the specific person has left the shooting range of a specific camera after a predetermined period of time has elapsed, the character-determining module 202 will erase the character data of the specific person from the specific camera. However, the character-determining module 202 cannot know when any person will leave the shooting range of any camera in advance. Thus, in order to avoid adding endless new person tags, the auto-erasing function of the character-determining module 202 will not clear the character information and person tag corresponding to a specific person until the specific person has not appeared in all cameras for more than a predetermined time, thereby saving storage space.

The data-integration module 203 may be configured to obtain the character data from the character-determining module, such as the recognized user identity or unrecognized character. The data-integration module 203 may further integrate the character data that appear in the scene images captured by each camera. For example, because the character data generated by the character-determining module 202 is mainly based on each person tag, the data-integration module 203 has to convert each person tag to be based on each camera. For example, the data-integration module 203 may arrange the person tags in the shooting range of each camera, and calculate the number of people in the scene images. If there is a person with known user identity, the data-integration module 203 will replace the person with his or her name, code, or employee number. If there is a person that has an unrecognizable identity in the scene image of the shooting range of each camera, the data-integration module 203 will add the number of strangers in the current shooting range of each of the cameras 110-1 to 110-N.

The data-integration module 203, for example, may transmit a user interface (e.g., can be shown by a table) to the web server 230 via a web service API, so that the web server 230 can provide web services, and the user may use the browser to view in real time the number of people whose user identity has been recognized, or the number of strangers in the shooting range of each camera.

Figure 2:
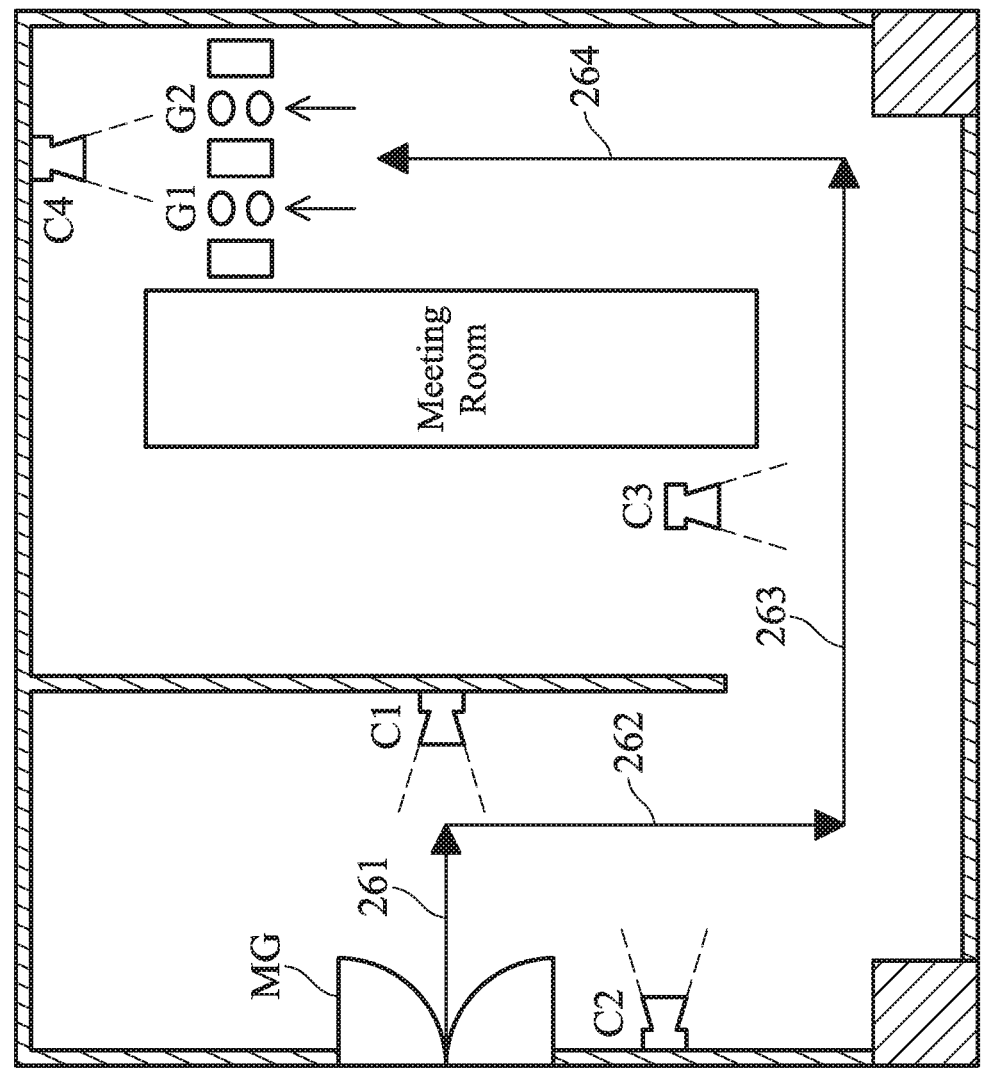
FIG. 2 is a diagram of a setting environment of the character-tracking system in accordance with an embodiment of the disclosure.
Figure 3:
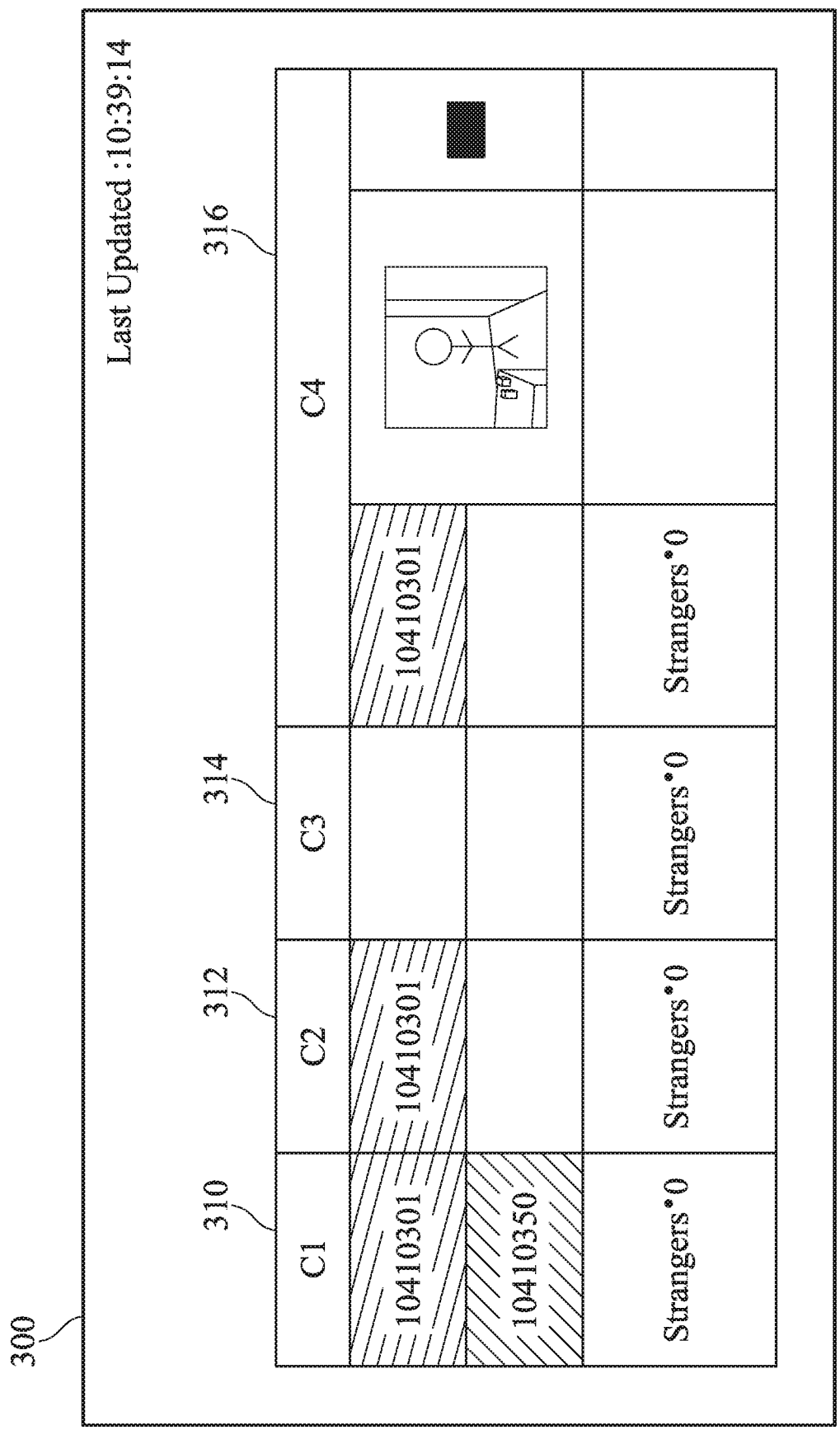
FIG. 3 is a diagram of the user interface of a web page presented by the web server in accordance with an embodiment of the disclosure.

FIG. 2 is a diagram of a setting environment of the character-tracking system in accordance with an embodiment of the disclosure. FIG. 3 is a diagram of the user interface of a web page presented by the web server in accordance with an embodiment of the disclosure.

In an embodiment, for convenience of description, four cameras 110-1 to 110-4 are taken as examples in FIG. 2, and each of the cameras 110-1 to 110-4 has a corresponding camera number C1 to C4. The cameras 110-1 to 110-4, for example, may be installed in a factory. The shooting range of the camera 110-1 having camera number C1 is aimed at the main gate MG of the office area 250, and the shooting ranges of the cameras 110-2 and 110-3 having camera numbers C2 and C3 are respectively aimed at different corridors, and the shooting range of the camera 110-4 having camera number C4 is aimed at the entrance gates G1 and G2 of the office area 250. If a user wants enter the internal office from the main gate MG, the user, for example, may go in the direction of arrows 261 to 264 to reach the entrance gates G1 and G2.

If the user advances in the direction of the arrows 261 to 264, the user will appear sequentially in the shooting ranges of the cameras 110-1 to 110-4. Thus, the computing servers 200, 210, and 220 will sequentially process the scene images captured by the cameras 110-1 to 110-4 for body tracking, facial recognition, character identification, and data integration. In some embodiments, the data-integration module 203 may further plan a presentation format of the identified user identities in the user interface. For example, camera numbers C1 to C4 corresponding to each of the cameras 110-1 to 110-4 may have a respective column showing the identified user identities, such as the columns 310, 312, 314, 316 shown in the user interface 300 in FIG. 3.

If there is a person with the same user identity in the scene images captured by each of the cameras 110-1 to 110-N, such as employee number 10410301, and there is a person in another user identity for camera number C1, such as employee number 10410350, and there is another character that cannot be identified for camera number C1, which can be regarded as a stranger.

Next, the data-integration module 203 may place the employee number 10410301 to the same row of columns 310 to 316, and displays the number of strangers detected by each camera numbered C1 to C4 in the lower columns of columns 310 to 316, as depicted in FIG. 3. In addition, the data-integration module 203 may randomly arrange different colors in different rows of the columns 310 to 316 to distinguish different characters. In addition, when a specific person has left a specific camera for more than a predetermined period of time, the data-integration module 203 may display a specific color (e.g., gray) in the column of the specific person in the corresponding field of the specific camera. Therefore, the walking patch of each character can be seen from the color change of different columns in the user interface 300. In addition, since the shooting range of the camera 110-4 is aimed at the entrance gates G1 and G2, if a specific person has appeared in the scene image captured by the camera 110-4, the data-integration module 203 will display the latest captured scene image, which includes the specific person, in the column corresponding to camera number C4. If there is a specific person is approaching the warning-sign area, the data-integration module 203 will further add a label subsequent to the column information of the specific person to indicate that the specific person has reached the warning-sign area, such as the entrance gate G1.

In the embodiment, the data-integration module 203 may transmit the table of the user interface to the web server 230 via a web service API, so that the web server 230 may provide web services, and the user may use the browser to view in real time the number of people whose user identities have been identified, and the number of strangers.

In some embodiments, the data-integration module 203 may include a time-counting function. For example, in order to prevent the web server from updating too quickly and causing information blockage, the data-integration module 203 will transmit the real-time updated columns of the user interface to the web server 230 after at least every predetermine time (e.g., 0.5 seconds).

Figure 4:
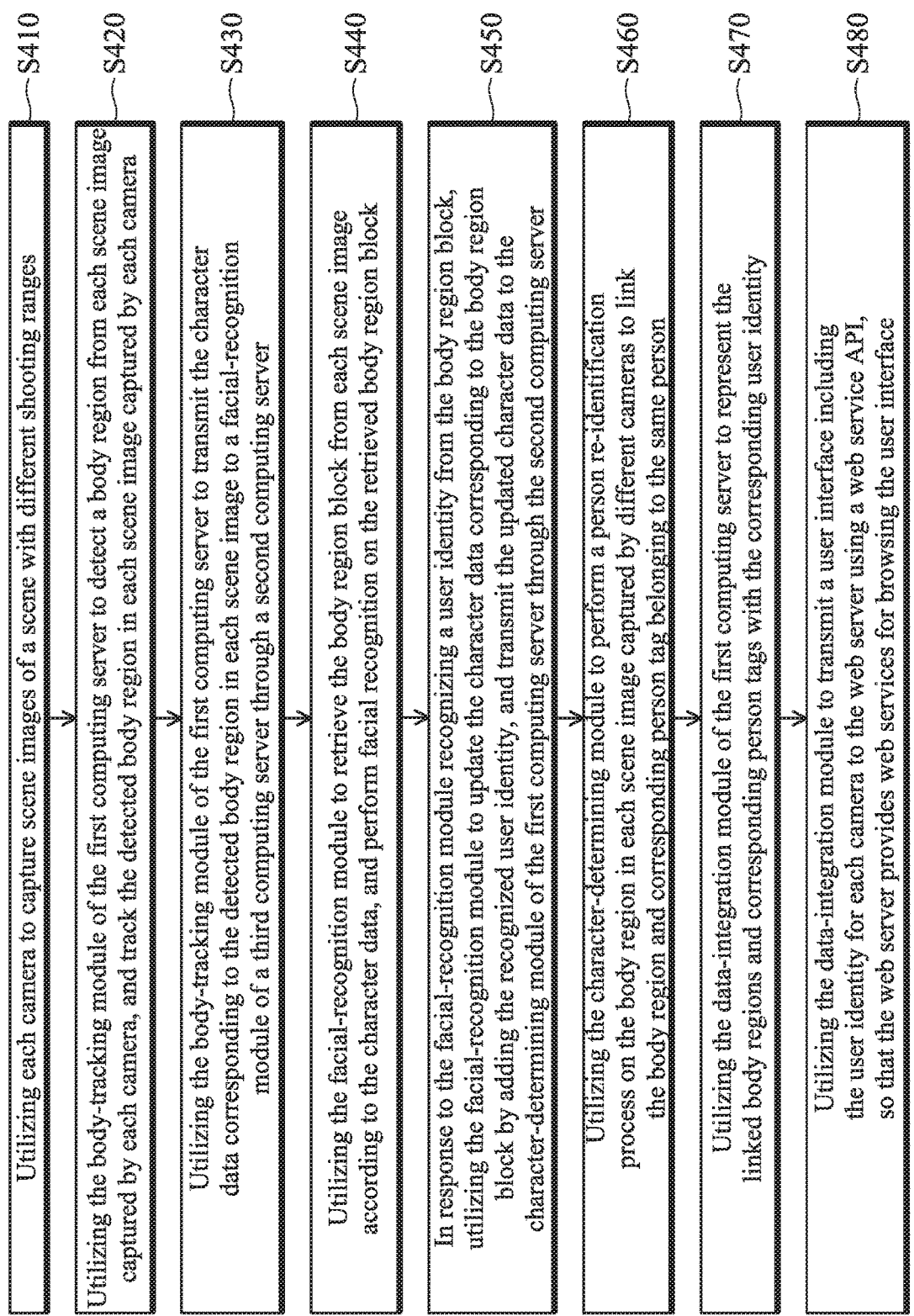
FIG. 4 is a flow chart of the character-tracking method in accordance with an embodiment of the disclosure.

FIG. 4 is a flow chart of the character-tracking method in accordance with an embodiment of the disclosure. The flow 400 of the character-tracking method includes steps S410 to S480.

In step S410, each camera is utilized to capture scene images of a scene with a different shooting range. For example, the shooting range of each of the cameras 110-1 to 110-N may be partially overlapping or not overlapping each other.

In step S420, a body-tracking module of a first computing server is utilized to detect a body region from each scene image captured by each camera, and track the detected body region in each scene image captured by each camera. For example, the body-tracking module 201 of the computing server 200 (i.e., the first computing server) may assign a person tag corresponding to the detected body region in each scene image, pack the coordinates, height/width, scene image number, camera number, and person tag of the detected body region in each scene image captured by each of the cameras 110-1 to 110-N to character data, and transmit the character data and scene images to the character-determining module 202.

In step S430, the body-tracking module of the first computing server is utilized to transmit the character data corresponding to the detected body region in each scene image to a facial-recognition module of a third computing server through a second computing server. For example, the facial-recognition module 221 of the computing server 220 (i.e., the third computing server) may receive each scene image and corresponding character data via the computing server 210 (i.e., the second computing server), and find the corresponding body region block (e.g., including the face and body) from each scene image using the coordinates, width, and height of the body region block provided in the character data.

In step S440, the facial-recognition module 221 retrieves the body region block from each scene image according to the character data, and performs facial recognition on the retrieved body region block, wherein the flow of facial recognition can be divided into face detection and identity recognition. For example, if the facial-recognition module 221 is capable of recognizing the user identity in the scene image by performing facial recognition (e.g., may compare the face region with the pre-enrolled facial database) on the face region of the body region block in the scene image, the facial-recognition module 221 may attach the identified user identity to the character data. If the facial-recognition module 221 is not capable of recognizing the user identity in the scene image by performing facial recognition, the facial-recognition module 221 may add the information of failed recognition to the character data.

In step S450, in response to the facial-recognition module 221 recognizing a user identity from the body region block, the facial-recognition module 221 updates the character data corresponding to the body region block by adding the recognized user identity, and transmits the updated character data to the character-determining module of the first computing server through the second computing server.

In step S460, the character-determining module performs a person re-identification process on the body region in each scene image captured by different cameras to link the body region and corresponding person tag belonging to the same person. For example, with regard to body-tracking module 201, the body-tracking module 201 is capable of recognizing different body regions from each scene image, and assigning a corresponding temporary person tag to each recognized body region. However, the body-tracking module 201 cannot confirm the user identity of each body region in the scene image. That is, the user identity of each person tag is unknown, and thus the facial-recognition module 221 is required to perform facial recognition on the body region block in each scene image to confirm the user identity. If the facial-recognition module 221 is capable of recognizing the user identity from the scene image, the character-determining module 202 may replace the temporary person tag in the character data corresponding to the scene image from the body-tracking module 201 with the user identity recognized by the facial-recognition module 221, where the recognized user identity indicates the relevant person enrolled in the facial database.

In step S470, the data-integration module of the first computing server is utilized to represent the linked body regions and corresponding person tags with the corresponding user identity, wherein the user identity may include a name, code, or employee number. If there is a person that has an unrecognizable identity in the scene image of the shooting range of each camera, the data-integration module 203 will add the number of strangers in the current shooting range of each of the cameras 110-1 to 110-N. In addition, the data-integration module 203 may transmit a user interface (e.g., can be shown by a table) to the web server 230 via a web service API, so that the web server 230 can provide web services, and the user may use the browser to view in real time the number of people whose user identity has been recognized, or the number of strangers in the shooting range of each camera.

In step S480, the data-integration module is utilized to transmit a user interface including the user identity for each camera to the web server using a web service API, so that the web server provides web services for browsing the user interface. For example, the user interface provided by the web services can be referred to in the embodiments of FIGS. 2 and 3.

In view of the above, a character-tracking system and a character-tracking method are provided in the disclosure. The character-tracking system and character-tracking method are capable of using body-tracking technology and facial recognition to enhance the accuracy of determining the user identity, and using the person ReID technology to link the character data including recognized user identity for different cameras. Accordingly, in comparison with the conventional facial recognition system, the character-tracking system and character-tracking method can greatly increase the recognition rate, and can overcome the unexpected situations that facial recognition may encounter and cause the problem being incapable of recognizing the user identity.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A character-tracking system, comprising:
a plurality of cameras, configured to capture scene images of a scene with different shooting ranges;
a first computing server, configured to detect a body region from each scene image captured by each camera, and track the detected body region in each scene image captured by each camera;
a second computing server; and
a third computing server;
wherein the first computing server transmits character data corresponding to the detected body region in each scene image to the third computing server through the second computing server;
wherein the third computing server retrieves a body region block from each scene image according to the character data, and performs facial recognition on the retrieved body region block;
wherein in response to the third computing server recognizing a user identity corresponding to the body region block, the third computing server adds the recognized user identity to the character data to update the character data, and transmits the updated character data to the first computing server through the second computing server;
wherein the first computing server performs a person re-identification (ReID) process on the body region in each scene image captured by each camera to link the body region and a corresponding person tag belonging to the same user in each scene image;
wherein the first computing server represents the linked body region and corresponding person tag with the recognized user identity,
wherein the first computing server transmits a user interface including the user identity for each camera to a web server via a web service application programming interface (API), so that the web server provides web services for browsing the user interface.

2. The character-tracking system as claimed in claim 1, wherein the first computing server assigns the person tag corresponding to body region in each scene image, packs coordinates, height, width, scene image number, camera number, and person tag of the detected body region in each scene image captured by each of the cameras to character data.

3. The character-tracking system as claimed in claim 2, wherein the third computing server receives each scene image and the corresponding character data through the second computing server, and retrieves the body region block from each scene image according to the character data, and each body region block comprises a face and a body.

4. The character-tracking system as claimed in claim 3, wherein the third computing server performs face detection on the body region block to retrieve a face region, and compares the detected face region with a pre-enrolled facial database for facial recognition.

5. The character-tracking system as claimed in claim 4, wherein in response to the third computing server being incapable of recognizing the user identity from the scene image, the third computing server adds recognition-failure information to the character data.

6. The character-tracking system as claimed in claim 5, wherein the first computing server assigns a corresponding person tag to each body region detected from each scene image, and replaces the person tag corresponding to each scene image with the user identity recognized by the third computing server according to a successful facial-recognition result in each scene image from the third computing server.

7. The character-tracking system as claimed in claim 6, wherein the user identity comprises a name, code, or employee number of a specific user.

8. The character-tracking system as claimed in claim 1, wherein the first computing server transmits the real-time updated user interface to the web server after every predetermined period of time.

9. The character-tracking system as claimed in claim 1, wherein in response to the first computing server determining that a specific user is approaching a warning-sign area in the scene in the scene image captured by a specific camera, the first computing server labels column information about the specific user on the user interface.

10. A character-tracking method, for use in a character-tracking system, wherein the character-tracking system comprises a plurality of cameras, a first computing server, a second computing server, and a third computing server, the method comprising:
utilizing each camera to capture scene images of a scene with different shooting ranges;
utilizing the first computing server to detect a body region from each scene image captured by each camera, and tracking the detected body region in each scene image captured by each camera;
utilizing the first computing server to transmit character data corresponding to the detected body region in each scene image to the third computing server through the second computing server;
utilizing the third computing server to retrieve a body region block from each scene image according to the character data, and perform facial recognition on the retrieved body region block;
in response to the third computing server recognizing a user identity corresponding to the body region block, utilizing the third computing server to add the recognized user identity to the character data to update the character data, and transmit the updated character data to the first computing server through the second computing server;
utilizing the first computing server to perform a person re-identification (ReID) process on the body region in each scene image captured by each camera to link the body region and a corresponding person tag belonging to the same user in each scene image;
utilizing the first computing server to represent the linked body region and corresponding person tag with the recognized user identity; and
utilizing the first computing server to transmit a user interface including the user identity for each camera to a web server via a web service application programming interface (API), so that the web server provides web services for browsing the user interface.

11. The character-tracking method as claimed in claim 10, further comprising:
utilizing the first computing server to assign the person tag corresponding to body region in each scene image, pack coordinates, height, width, scene image number, camera number, and person tag of the detected body region in each scene image captured by each of the cameras to character data, and transmit the character data and scene images to the first computing server.

12. The character-tracking method as claimed in claim 11, wherein the step of utilizing the third computing server to retrieve a body region block from each scene image according to the character data, and perform facial recognition on the retrieved body region block comprises:
   utilizing the third computing server to receive each scene image and the corresponding character data through the second computing server, and retrieving the body region block from each scene image according to the character data, and each body region block comprises a face and a body.

13. The character-tracking method as claimed in claim 12, wherein the step of utilizing the third computing server to retrieve a body region block from each scene image according to the character data, and perform facial recognition on the retrieved body region block further comprises:
   utilizing the third computing server to perform face detection on the body region block to retrieve a face region, and compare the detected face region with a pre-enrolled facial database for facial recognition.

14. The character-tracking method as claimed in claim 13, further comprising:
   in response to the third computing server being incapable of recognizing the user identity from the scene image, utilizing the third computing server to add recognition-failure information to the character data.

15. The character-tracking method as claimed in claim 13, further comprising:
   utilizing the third computing server to assign a corresponding person tag to each body region detected from each scene image; and
   utilizing the first computing server to replace the person tag corresponding to each scene image with the user identity recognized by the third computing server according to a successful facial-recognition result in each scene image from the third computing server.

16. The character-tracking method as claimed in claim 15, wherein the user identity comprises a name, code, or employee number of a specific user.

17. The character-tracking method as claimed in claim 10, further comprising:
   utilizing the first computing server to transmit the real-time updated user interface to the web server after every predetermined period of time.

18. The character-tracking method as claimed in claim 10, further comprising:
   in response to the first computing server determining that a specific user is approaching a warning-sign area in the scene in the scene image captured by a specific camera, utilizing the first computing server to label column information about the specific user on the user interface.

\* \* \* \* \*